United States Patent [19]

Matschinsky et al.

[11] Patent Number: 4,671,532
[45] Date of Patent: Jun. 9, 1987

[54] REAR WHEEL SUSPENSION, ESPECIALLY FOR DRIVEN REAR WHEELS

[75] Inventors: Wolfgang Matschinsky, Munich; Wolfgang Sautter, Graefelfing; Ludwig Strasser, Ebersberg; Rudolf Mueller, Dachau, all of Fed. Rep. of Germany

[73] Assignee: Bayerische Motoren Werke AG, Fed. Rep. of Germany

[21] Appl. No.: 832,683

[22] Filed: Feb. 25, 1986

[30] Foreign Application Priority Data

Feb. 28, 1985 [DE] Fed. Rep. of Germany ....... 3507081

[51] Int. Cl.⁴ ................................................ B60G 3/20
[52] U.S. Cl. ..................................... 280/701; 280/666; 280/675; 280/716; 280/725
[58] Field of Search ............... 280/771, 93, 95 R, 96.1, 280/660, 663, 666, 670, 673, 675, 690, 701, 725, 724, 716

[56] References Cited

U.S. PATENT DOCUMENTS 3,804,433 4/1974 Scherenberg et al. ............... 280/701
3,871,467 3/1975 Senft et al. ........................... 280/701
4,421,332 12/1983 Kosak et al. ......................... 280/701
4,556,238 12/1985 Matschinsky ........................ 280/725

Primary Examiner—John J. Love
Assistant Examiner—Kenneth R. Rice
Attorney, Agent, or Firm—Barnes & Thornburg

[57] ABSTRACT

A rear wheel suspension for motor vehicles, especially for driven rear wheels which comprises a wheel carrier supporting the wheel, which is connected with the vehicle body by way of an upper cross guide member and two lower cross guide members. Additionally, a longitudinal arm is pivotally connected with the wheel carrier. This longitudinal arm is supported at the forward lower cross guide member between the two ends thereof by way of a connecting bearing which couples this guide member with the longitudinal arm approximately in the vertical direction but permits approximately horizontal relative movements between the guide member and the longitudinal arm. An instantaneous longitudinal center of rotation can be realized by this type of construction about which the wheel pivots during the spring compression movement whereas the real point of pivotal connection of the longitudinal arm is located considerably lower and nearer the wheel.

26 Claims, 27 Drawing Figures

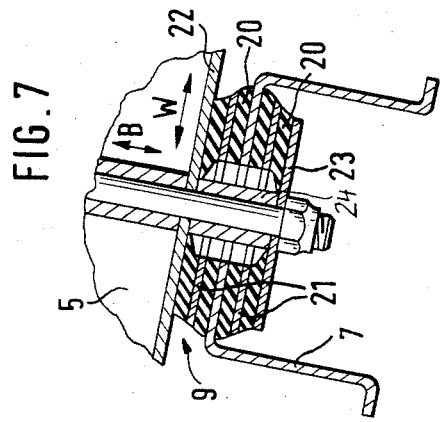
FIG.7
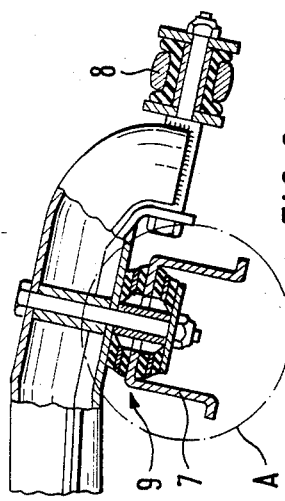
FIG.6
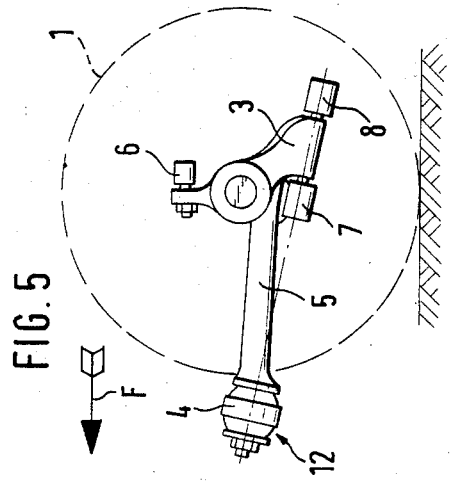
FIG.5
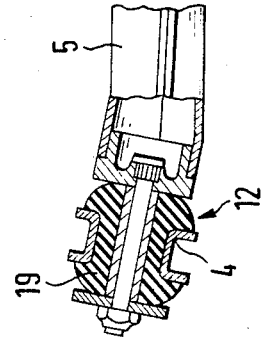
FIG.4
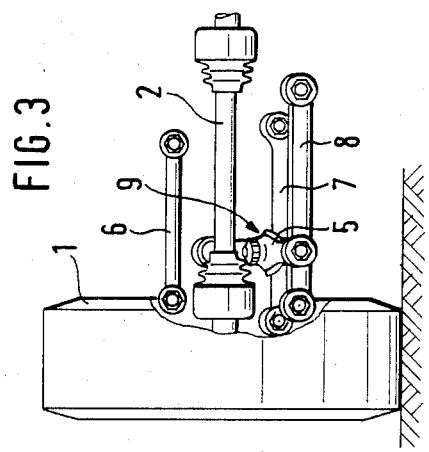
FIG.3
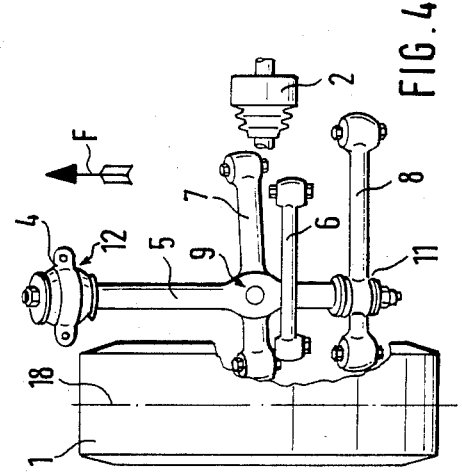

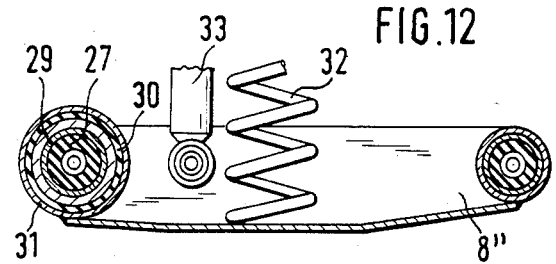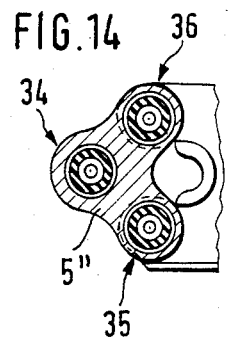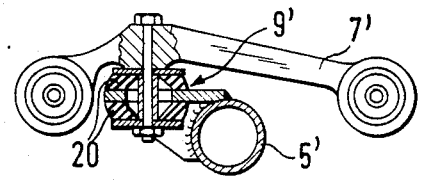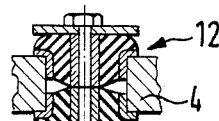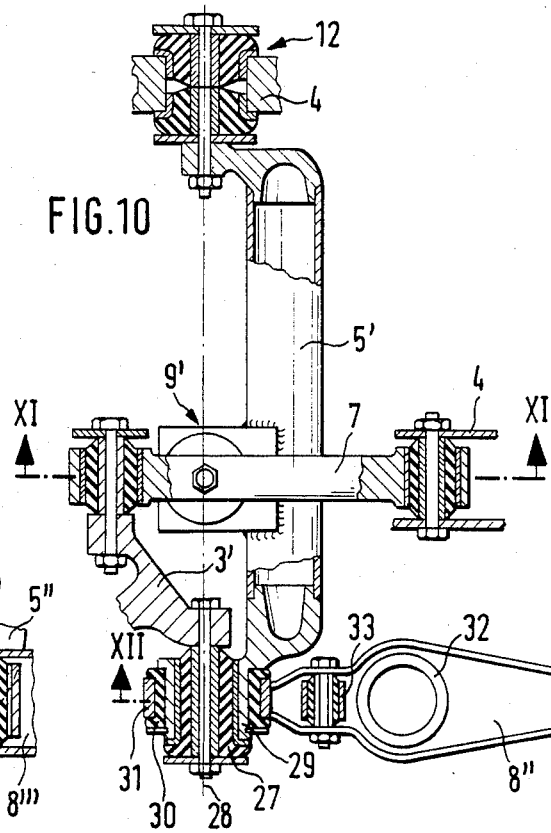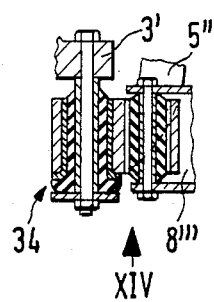

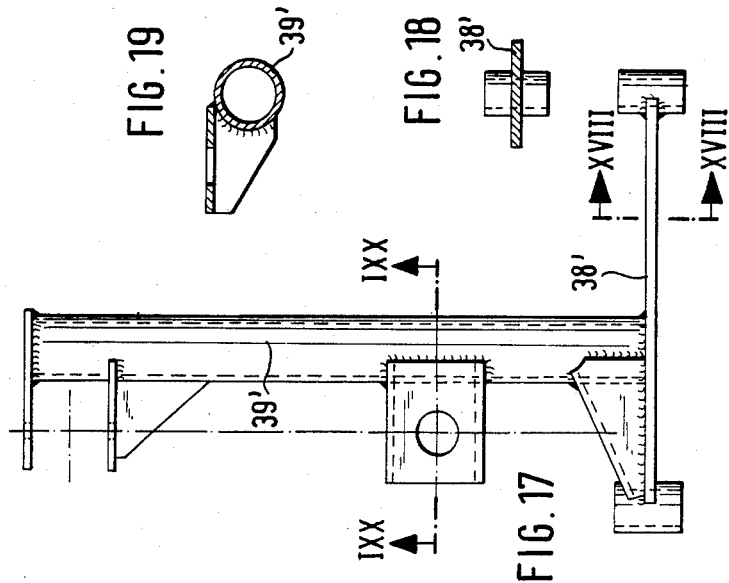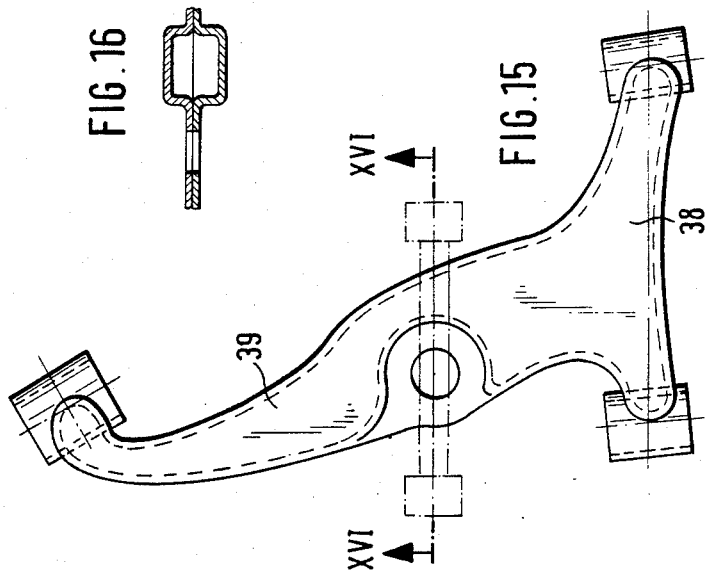

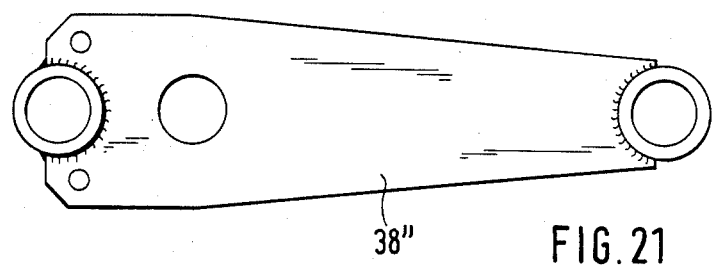
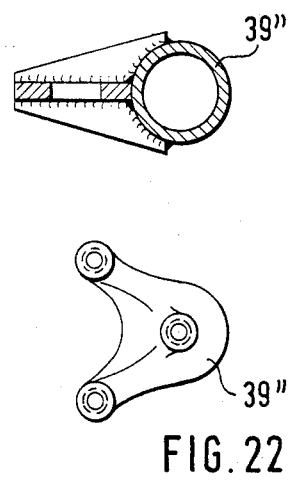
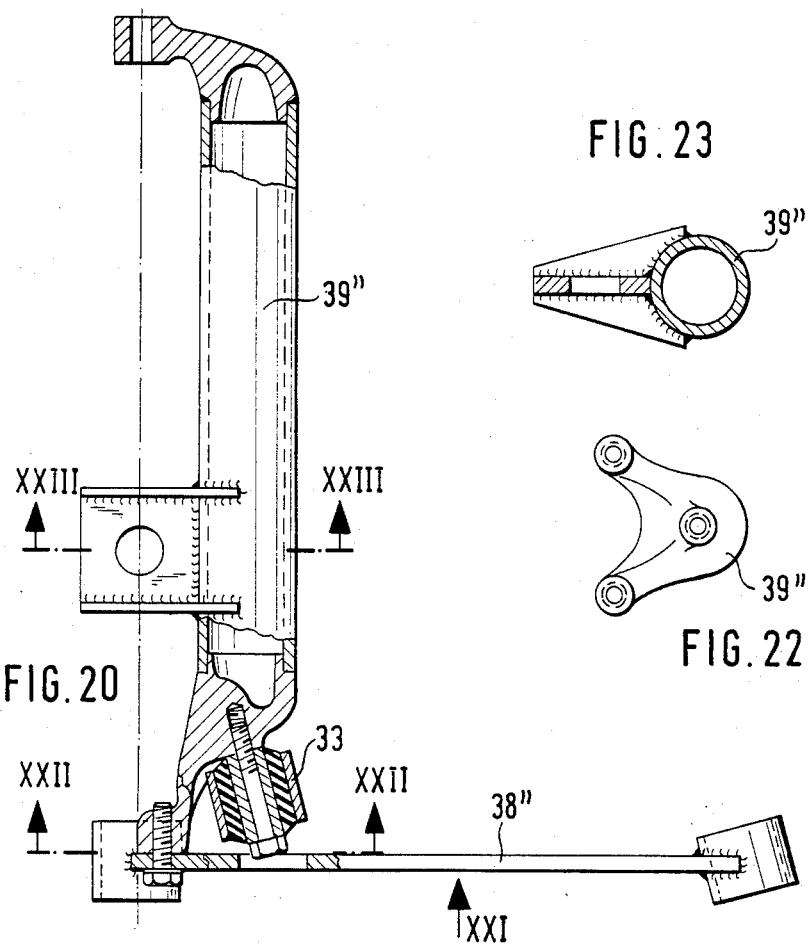

REAR WHEEL SUSPENSION, ESPECIALLY FOR DRIVEN REAR WHEELS

The present invention relates to a rear wheel suspension for motor vehicles, especially for driven rear wheels, as disclosed, for example in the DE-OS No. 20 38 880.

In the rear wheel suspension according to the aforementioned publication, the longitudinal arm is rigidly connected with the wheel carrier, properly speaking, and its forward bearing point participates in essentially determining the "longitudinal center of rotation" of the wheel suspension. If the axle is to possess acceleration pitching compensation, this bearing point has to be arranged higher than the wheel center, as a result of which it comes into space conflict with the rear seat bench in passenger motor vehicles. Owing to the limited structural space, also the length of the longitudinal arm is limited which leads to pronounced angle changes of the wheel carrier in side view in the course of the spring movement. As a rule, strong camber changes over the spring travel have to be accepted with such wheel suspensions in order to obtain, on the other, a small toe-in change over the spring travel.

A wheel suspension of a somewhat different type is disclosed in the prior German patent application No. P 33 31 247, not published at the time of the priority application, by means of which the real point of pivotal connection of the longitudinal arm can be provided relatively low—possibly even below the wheel axis—, whereby nonetheless the wheel pivots during the spring movement about a considerably higher ideal instantaneous center of rotation which is also located further in front of the real point of pivotal connection. In this wheel suspension, the longitudinal arm is additionally pivotally connected with the wheel carrier.

The task is to be solved with the present invention to create with moderate structural expenditure a braking and starting pitch compensation with a camber change and toe-in curve over the spring travel selectable at will, whereby the elastokinematic matching is to be readily controllable also without use of an elastically suspended auxiliary frame.

The underlying problems are solved according to the present invention in that the longitudinal arm is pivotally connected with the wheel carrier either directly or indirectly, whereby the longitudinal arm is supported at one of the two lower guide members between the two ends thereof by way of a connecting bearing which couples this guide member with the longitudinal arm approximately in the vertical direction but permits approximately horizontal relative movements between the guide member and the longitudinal arm.

During the spring movement, a further pivot movement is forced or imposed upon the wheel carrier pivotal with respect to the longitudinal arm, about its joint connection with the longitudinal arm, in addition to its pivot movement about the real forward bearing point of the longitudinal arm. This becomes possible in that the longitudinal arm forcibly takes along the cross guide member provided with the connecting bearing and therewith also the joint thereof on the side of the wheel carrier. It can be achieved by means of the additional forcible pivoting of the wheel carrier effected thereby that the wheel, similar as with the aforementioned non-prepublished patent application, moves during the spring compression about an ideal instantaneous center of rotation which is located considerably higher and markedly in front of the real bearing point, by means of which the longitudinal arm is pivotally connected at the vehicle body or the like.

These and other objects, features and advantages of the present invention will become more apparent from the following description when taken in connection with the accompanying drawing which shows, for purposes of illustration only, several embodiments in accordance with the present invention, and wherein.

Figure 1:
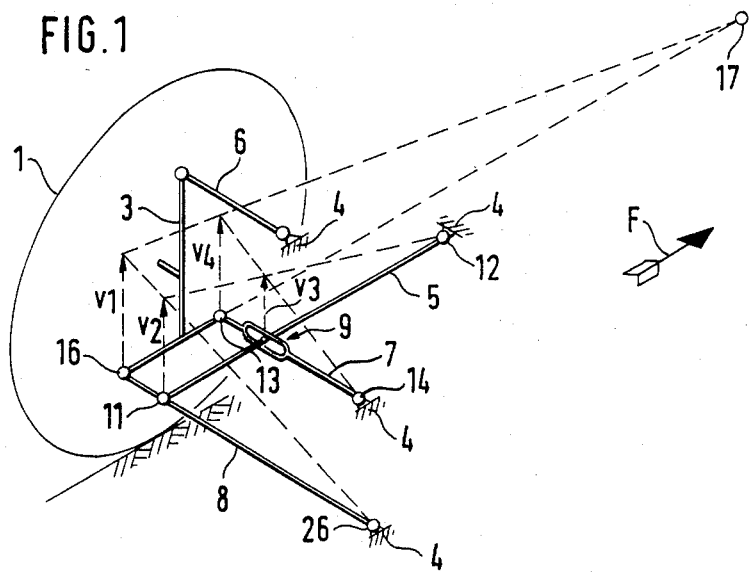
FIG. 1 is a schematic perspective view of a first embodiment of a rear wheel suspension in accordance with the present invention.
Figure 8:
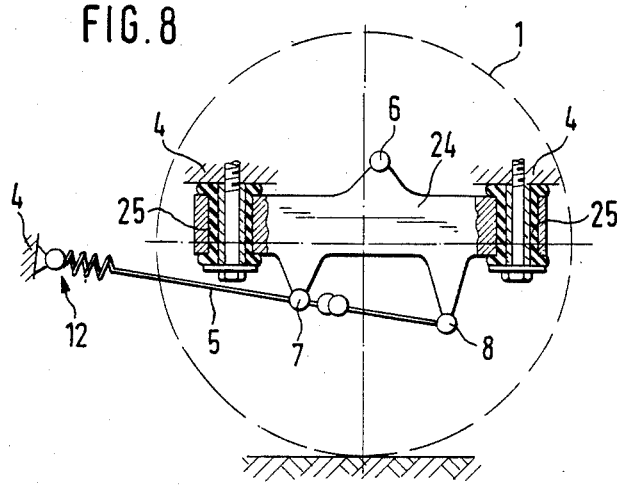
Figure 9:
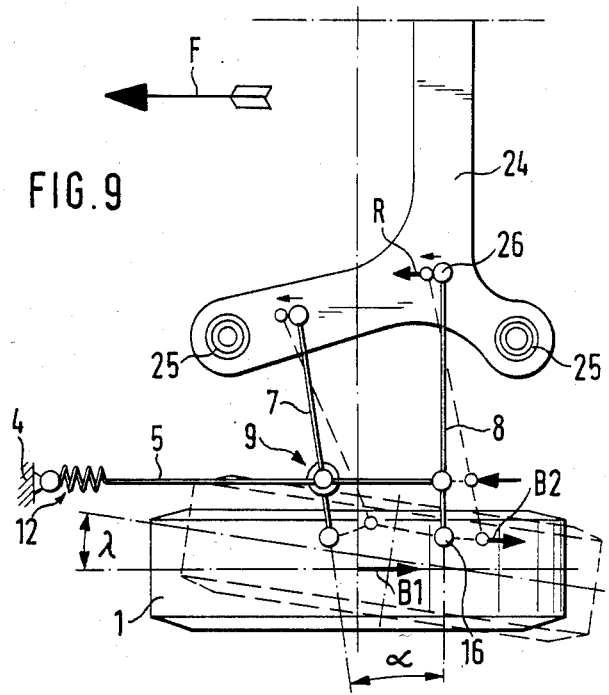

FIGS. 3, 4, and 5 are, respectively, rear elevational view, top plan view and side view of the wheel suspension illustrated in FIG. 1;

FIG. 6 is a partial cross-sectional view, on an enlarged scale, of the longitudinal arm of the wheel suspension according to FIG. 5;

FIG. 7 is a partial cross-sectional view, illustrating, on an enlarged scale, the details of the section of the wheel suspension of FIG. 6 indicated by the dash-and-dot circle A;

FIG. 8 is a partly schematic side elevational view of a still further modified embodiment of a wheel suspension in accordance with the present invention, similar to FIG. 1, but with an auxiliary frame;

FIG. 9 is a top plan view on the wheel suspension of FIG. 8;

FIG. 10 is a plan view, partly in cross section, on a further embodiment of a rear wheel suspension in accordance with the present invention, corresponding approximately to the showing of FIG. 4;

FIG. 11 is a cross-sectional view, taken along line XI—XI of FIG. 10;

FIG. 12 is a cross-sectional view, taken along line XII—XII of FIG. 10;

FIG. 13 is a partial cross-sectional view, corresponding to FIG. 10, of still another modified embodiment of a rear wheel suspension in accordance with the present invention;

FIG. 14 is an elevational view, partly in cross section, taken in the direction of arrow XIV of FIG. 13.

Figure 26:
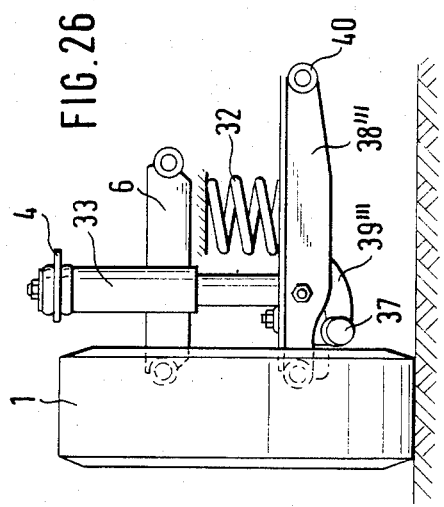
Figure 24:
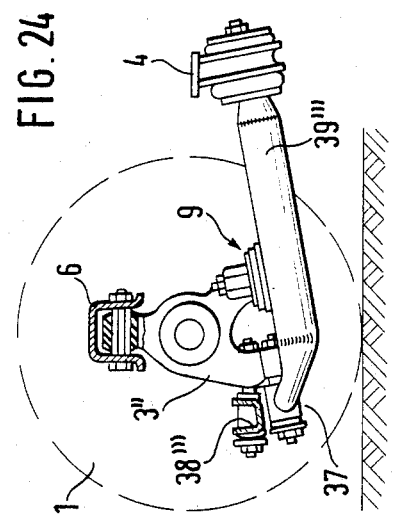
Figure 25:
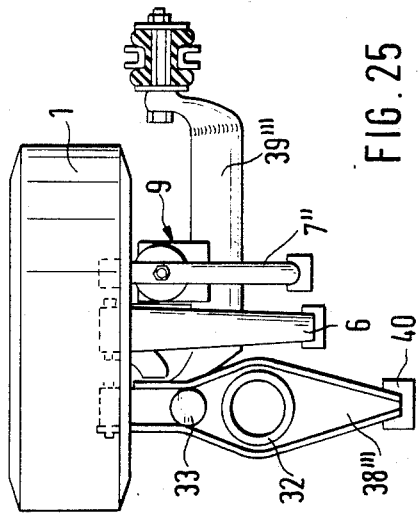
Figure 27:
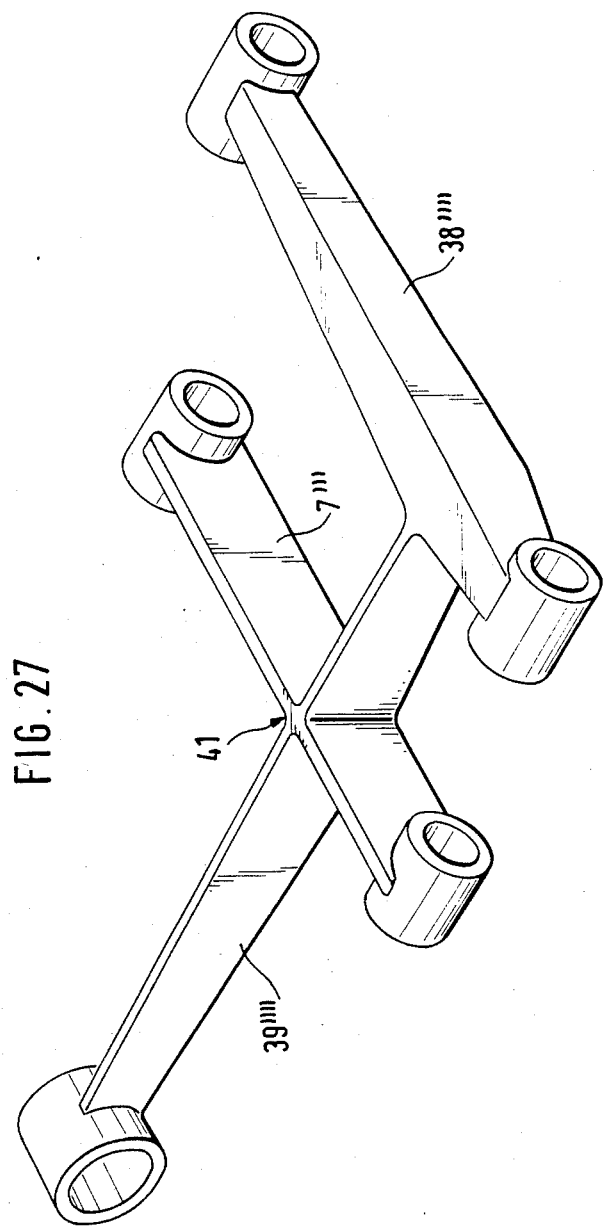

FIG. 15 is a plan view on the longitudinal arm-cross guide member connection of a further embodiment of a rear wheel suspension in accordance with the present invention;

FIG. 16 is a cross-sectional view, taken along line XVI—XVI of FIG. 15;

FIG. 17 is a plan view, corresponding to FIG. 15, on a further embodiment of a rear wheel suspension according to the present invention;

FIGS. 18 and 19 are cross-sectional view, taken along lines XVIII—XVIII and XIX—XIX of FIG. 17;

FIG. 20 is a plan view, partially in cross section, corresponding to FIG. 17, of still another embodiment of a rear wheel suspension in accordance with the present invention;

FIG. 21 is an elevational view, taken in the direction of arrow XXI—XXI in FIG. 20;

FIGS. 22 and 23 are cross-sectional views, taken along lines XXII—XXII and XXIII—XXIII, respectively, of FIG. 20;

FIGS. 24, 25 and 26 are, respectively, a side elevational view, a plan view and a rear elevational view of a still further embodiment of a wheel suspension in accordance with the present invention; and FIG. 27 is a perspective view of a composite longitudinal arm/lower cross guide member according to still a further embodiment of the present invention.

Referring now to the drawing wherein like reference numerals are used throughout the various views to designate like parts, the schematic showing according to FIG. 1 is coordinated to the views according to FIGS. 3–7 which approach reality more closely. The rear axle suspension shown in the aforementioned figures serves in the illustrated embodiment for the driven rear wheels 1; a drive shaft 2 is also shown, respectively, indicated for that reason in FIGS. 3 and 4. The wheel carrier 3 supporting the wheel 1 is connected with the vehicle body 4, merely indicated schematically, by way of a longitudinal arm 5 extending in the vehicle longitudinal direction. The longitudinal arm 5 points in the illustrated embodiments from the wheel carrier 3 forwardly in the driving direction F. An upper cross guide member 6 engages at the wheel carrier 3 as upper wheel guide member whereas additionally a forward lower cross guide member 7 and a rear lower cross guide member 8 are provided as lower wheel guide members. The cross guide members 6, 7 and 8 are pivotally connected at the vehicle body 4 with their inner ends. However, they may also be pivotally connected at an auxiliary frame as will be briefly described hereinafter by reference to FIGS. 8 and 9.

In lieu of the upper cross guide member 6, also a spring leg might be used as upper wheel guide member which would have to be pivotally connected at the wheel carrier by means of a corner-rigid pivot joint having an essentially transversely extending axis of rotation.

In the embodiment according to FIG. 1 and the FIGS. 3 to 5, the longitudinal arm 5 is indirectly pivotally connected with the wheel carrier 3, for it is pivotally connected with its rear end at the rear lower cross guide member 8 whose outer end again pivotally engages at the wheel carrier 3. In the preferred embodiments illustrated in the drawing, the longitudinal arm 5 is supported with the forward guide member 7 of the two lower guide members 7 and 8 intermediate the two ends of the forward guide member 7 by way of a connecting bearing generally designated by reference numeral 9 which couples this forward lower guide member 7 with the longitudinal arm 5 approximately in the vertical direction, i.e., does not permit any significant vertical relative movements of the longitudinal arm 5 in relation to the cross guide member 7 within the area in which the two intersect each other. The connecting bearing 9, in contrast, permits horizontal relative movements between the forward lower cross guide member 7 and the longitudinal arm 5. If the longitudinal arm 5 and the forward lower cross guide member 7 are located in one plane—as assumed in the schematic view according to FIG. 1—then this would mean, for example, with such a constructive design, that the connecting line of the joints 11 and 12 at the ends of the longitudinal arm 5 and the connecting line of the joints 13 and 14 at the ends of the cross guide member 7 always remain in a common plane whereas, however, relative movements between the longitudinal arm 5 and the cross guide member 7 are possible in every direction within this plane.

Figure 2:
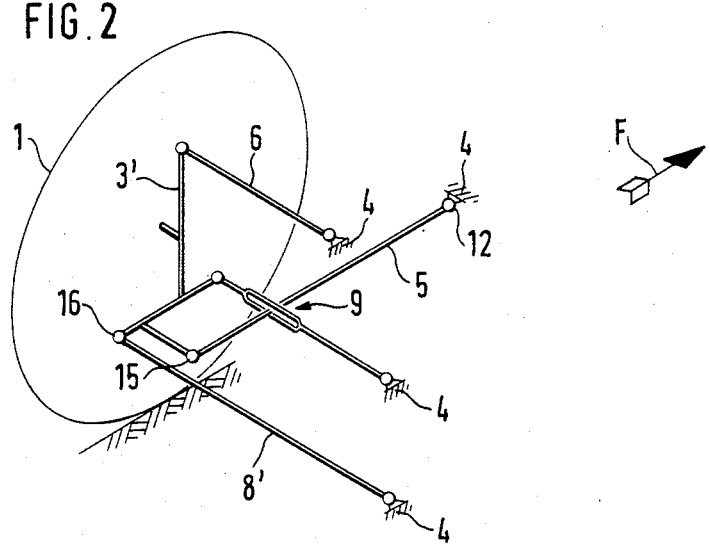
FIG. 2 is a schematic perspective view of a further embodiment of a rear wheel suspension in accordance with the present invention with the showing corresponding to that of FIG. 1.

Such a connecting bearing generally designated by reference numeral 9 is symbolically shown in FIGS. 1 and 2 by a slot in the lower cross guide member 7, through which extends the longitudinal arm 5. The longitudinal arm 5 is to be able thereby to move not only lengthwise of the slot but also perpendicular to the longitudinal direction of the slot, approximately in the horizontal direction. By contrast, in the approximately vertical direction (velocity vector $v_3$) the longitudinal arm 5 and the cross guide member 7 are tied together, i.e., the vertically moving longitudinal arm 5 takes along with it in this direction the cross guide member 7 and vice versa.

The embodiment according to FIG. 2 differs from the embodiment according to FIG. 1 in that the longitudinal arm 5 is pivotally connected directly at the wheel carrier 3'—by way of the joint 15. The operation of the rear wheel suspension in accordance with the present invention to be explained hereinafter by reference to FIG. 1, however, also applies in principle to the embodiment according to FIG. 2.

It is assumed in FIG. 1 that the outer joints 13 and 16 of the lower cross guide members 7 and 8 are located in one longitudinal plane. With a predetermined spring compression velocity of the wheel carrier 3, the outer joint 16 of the rear cross guide member 8 receives the velocity $v_1$. Dependent on the distance condition of the joint 11 from the joint 16, the joint 11, on which the longitudinal arm 5 engages at the lower rear cross guide member 8, receives the velocity $v_2$. With the length conditions of the longitudinal arm 5 (distance of the joint 11 from the connecting bearing 9 in relation to the overall length of the longitudinal arm 5), the connecting bearing 9 reaches the velocity $v_3$. As a rule, the forward lower cross guide member 7 is shorter than the rear lower cross guide member 8 for purposes of obtaining a good toe-in curve over the spring compression movement, which with the lever arm ratio of the forward lower cross guide member 7 (distance of the joint 13 from the connecting bearing 9 in the ratio to the overall length of the cross guide member 7), as can be seen from the schematic view in FIG. 1, again leads to a greater increase of the velocity $v_4$ of the outer joint 13 than would correspond to the ratio of the velocities $v_1$ to $v_2$. A "longitudinal center of rotation" 17 can be determined from the velocities $v_1$ and $v_4$ about which the wheel 1 pivots instantaneously. This longitudinal center of rotation 17 is located, as can be seen from the drawing, higher and markedly further forwardly than the real joint 12, by means of which the longitudinal arm 5 is supported at the body. The location of the longitudinal center of rotation 17 can be determined within wide limits by a correct selection of the lever arm ratios described hereinabove. Nonetheless, the remaining axle components can be optimized as regards axle kinematics without the otherwise frequently necessary compromises. Thus, it is for example possible to determine the lengths of the lower cross guide members 7 and 8 in such a manner that a toe-in curve over the spring compression travel is achieved which is as favorable as possible. These two lower guide members may also be somewhat back-swept in plan view—as can be seen in FIG. 4—in order to obtain an instantaneous center of rotation located outside of the wheel center plane 18 for the longitudinal spring movements. As known, this instantaneous center of rotation may additionally be located also to the rear of the wheel axis as viewed in plan view which contributes to a favorable toe-in behavior in case of lateral forces.

In FIG. 6, a possible modification of the longitudinal arm 5 is illustrated in detail which is composed essentially of two sheet metal shell parts and is welded together at its ends with correspondingly constructed connecting pieces. The rubber bushing 19 used in the forward joint generally designated by reference numeral 12 is of relatively large volume, for it is to absorb as softly as possible longitudinal impacts, which are introduced into the vehicle body 4 nearly exclusively by way of the longitudinal arm 5, for purposes of obtaining a good longitudinal spring action of the entire wheel suspension which is important for comfort reasons.

FIG. 6 and especially FIG. 7 illustrate a possibility how a connecting bearing 9 having the properties already described hereinabove can be realized. Rubber pressure plates 20 having a relatively large area are used therefor which are arranged perpendicularly to the hard load direction B. Additionally, stiff intermediate plates 21 are embedded in the rubber pressure plates 20. The forward lower cross guide member 7 which is far-reachingly U-shaped in cross section, is provided on both sides of its web with the described rubber pressure plates 20; the lower wall 22 of the longitudinal arm is pressed against the upper rubber pressure plate and a counter-clamping plate 23 is pressed against the lower rubber pressure plate 20 which is clamped against the wall 22 under interposition of a spacer bushing 24. The connecting bearing 9 of the described arrangement and construction can absorb large forces in the hard load direction B, to which only very small elastic relative movements of the longitudinal arm 5 with respect to the cross guide member 7 are coordinated in the hard, approximately vertical load direction B. On the other hand, this connecting bearing permits a sufficient relative displacement of the longitudinal arm 5 to the lower cross guide member 7 in the approximately horizontal soft load direction W without having to produce large deformation forces for that purpose.

In the embodiment according to FIGS. 8 and 9, the two lower cross guide members 7 and 8 are not pivotally connected directly at the vehicle body 4 but are pivotally connected at an auxiliary frame 24 elastically connected with the vehicle body 4; as merely schematically indicated in FIG. 8, the upper cross guide member 6 also pivotally engages at the auxiliary frame 24. The elastic connection of the auxiliary frame 24 with the vehicle body 4 takes place in any known manner by way of rubber bushings 25 whose axes extend vertically in FIG. 4 but which may also be positioned at an inclination. The auxiliary frame 24 could also receive the rear axle gear, the support springs, the shock absorbers and also the stabilizer. By contrast, the longitudinal arm 5 is as heretofore pivotally connected directly at the vehicle body with the longitudinal elasticity provided by the rubber bushings 19.

The wheel position change in the direction of toe-in which results during the braking as a result of the back-sweep of the lower cross guide members 7 and 8 in conjunction with the yielding pivotal connection of the longitudinal arm 5, is indicated in dash lines in FIG. 9—shown for sake of clarity in an exaggerated manner. The already mentioned back-sweep $\alpha$ leads at first to the toe-in angle $\lambda$ under the influence of the brake force B1 as desired. The force B2 from the brake force B1 which is transmitted at least approximately in the same magnitude to the joint 16 of the rear lower cross guide member 8, leads to a forwardly directed reaction force R at the inner joint 26 of the rear lower cross guide member 8. The reaction force R finally leads again to a displacement of the elastically suspended auxiliary frame 24 in the forward direction which further reinforces the effect of the wheel 1 passing over into toe-in. If drive forces are exerted on the wheel suspension, then the displacement takes place, as desired, in the reverse direction.

With a one-sided braking or with a unilaterally acting drive force, an additional inclined positioning of the elastically supported auxiliary frame 24 is added analogously and, more particularly also in the desired direction of rotation.

Depending on the elastic suspension of the auxiliary frame 24 at the vehicle body 4, the auxiliary frame 24 may also displace itself in case of lateral forces either parallel or in the sense of "understeering" depending on the driving behavior which is desired.

An embodiment is described in FIGS. 10 to 12 which is recommended if the horizontal distances of the joints 11 and 16 (FIG. 1) or of the joints 15 and 16 (FIG. 2) are to become as small as possible which has certain limits by reason of the minimum size of the joint bushings and the joint eyes surrounding the same. As can be recognized in particular in FIG. 10, the longitudinal arm 5' is connected with the wheel carrier 3' by way of a rubber bushing 27. The joint by means of which the rear lower cross guide member 8" is pivotally connected at the wheel carrier 3' has a pivot axis 28 which is concentric to that by means of which the longitudinal arm 5' is pivotally connected at the wheel carrier 3'. The joint eye 29 which receives the rubber joint bushing 27 connected internally with the wheel carrier 3', is thereby externally surrounded by a further rubber joint bushing 30 which is finally surrounded by the joint eye 31 of the cross guide member 8". The lower rear cross guide member 8" which supports the support spring 32 and the shock absorber 33 is constructed in the embodiment illustrated in FIGS. 10 to 12 with a U cross section open in the upward direction. FIGS. 13 and 14 illustrate a further modification, by means of which the joint connection of the lower rear cross guide member 8"'0 with the longitudinal arm 5" and the joint connection thereof with the wheel carrier 3' can be arranged closely adjacent one another in the horizontal direction. The rear end of the longitudinal arm 5" is thereby connected by way of a rubber joint 34 with the wheel carrier 3' and the rear lower cross guide member 8"' is thereby connected with the end of the longitudinal arm 5" by way of two further rubber bearings 35 and 36 arranged at a distance from one another one above the other—as viewed in rear elevational view. The connection of the cross guide member 8"' with the longitudinal arm 5" is relatively buckling-resistant in this manner about a longitudinal axis but is relatively soft in bending horizontally about an upright axis though limited (to the necessary extent).

In the embodiment according to FIGS. 15 and 16, the longitudinal arm 39 and the rear lower cross guide member 38 are constructed as a common or one-piece structural part. Fewer individual parts are necessary in this manner; however, other requirements must be fulfilled because the rigid guide member connection pivots during spring compression movement. The positional angles of the bearing eyes of this compound guide member must be selected very carefully in order not to have to select excessively large the transverse softness of the rear inner bearing.

The embodiment according to FIGS. 17 to 19 represents in this respect fewer requirements because the cross guide member 38' connected with the longitudinal arm 39' is relatively soft in bending about a vertical axis. This is achieved, as can also be seen in FIG. 18, by a cross guide member 38' which is formed essentially by an edgewise upright metal leaf.

The embodiment according to FIGS. 20 to 23 also provides a cross guide member 38' relatively soft in bending about an upright axis—also as edgewise upright metal leaf—which, however, in its end area on the side of the wheel carrier is threadably connected to the rear end of the longitudinal arm 39''. On the one hand, such a guide member connection can be manufactured more easily of individual parts which themselves can be manufactured in a simple manner while, on the one hand, welding seams can be dispensed with at the transition place from cross guide member 38'' to longitudinal arm 39'', which is critical from a stress point of view.

In the embodiment according to FIGS. 24 to 26, the upper cross guide member 6 as upper wheel guide element as also the two lower cross guide members 38''' and 7'' are constructed as straight guide members with a U-shaped profile cross section that is relatively simple to manufacture. The joint 37, by means of which the longitudinal arm 39''' is pivotally connected at the wheel carrier 2' can be located in this embodiment relatively low which favors the start pitching compensation. The rear lower cross guide member 38''' pivotally connecting thereabove at the wheel carrier 3'' can be located comparatively high which enables a favorable height of the roll center and on the other—by reason of the higher cross guide joint 40 on the side of the vehicle frame—nonetheless assures a good road clearance.

FIG. 27 finally illustrates a still further modified embodiment for realizing the principle of the present invention. The longitudinal arm 39'''' and the two lower cross guide members 38'''' and 7''' are thereby constructed as a common structural part, i.e., one-piece structural part. This structural part can be made of a fiber compound material; however, also a metallic welded construction is feasible. One of the cross guide members 7''' or 38''''—in the illustrated embodiment, the rear lower cross guide member 38''''—is thereby constructed appropriately relatively stiff in bending about an upright axis. Transverse displacements of the point of intersection 41 are thereby possible due to the bending softness of the longitudinal arm 39'''' about a vertical axis while longitudinal displacements of this point of intersection are possible by the bending softness of the forward lower cross guide member 7'''. However, in an approximately vertical direction relative movements between the longitudinal arm 39'''' and the forward lower cross guide member 7''' are not possible with this embodiment so that the kinematics for obtaining the longitudinal center of rotation 17 described by reference to FIG. 1 are possible.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A rear wheel suspension for motor vehicles, comprising a wheel carrier means supporting thereon a wheel, longitudinal arm means extending essentially in the vehicle longitudinal direction, an upper wheel guide means and two lower transverse guide means, said wheel carrier means being operatively connected with a relatively fixed vehicle part by way of said longitudinal arm means, said upper wheel guide means and said lower transverse guide means, the longitudinal arm means being pivotally connected with the wheel carrier means, and the longitudinal arm means being supported at one of the two lower transverse guide means between the two ends thereof by way of a connecting bearing means which couples said one guide means with the longitudinal arm means approximately in the vertical direction but permits approximately horizontal relative movements between said one guide means and the longitudinal arm means.

2. A rear wheel suspension according to claim 1, wherein the rear wheels are driven rear wheels.

3. A rear wheel suspension according to claim 1, wherein the relatively fixed part is a part of the vehicle body.

4. A rear wheel suspension according to claim 1, wherein the longitudinal arm means is pivotally connected directly with the wheel carrier means.

5. A rear wheel suspension according to claim 1, wherein the longitudinal arm means is pivotally connected indirectly with the wheel carrier means.

6. A rear wheel suspension according to claim 1, wherein the longitudinal arm means is directed forwardly from the wheel carrier means.

7. A rear wheel suspension according to claim 6, wherein the connecting bearing means is provided at the forward lower cross guide means.

8. A rear wheel suspension according to claim 7, wherein the longitudinal arm means is pivotally connected with its rear end at the wheel carrier means.

9. A rear wheel suspension according to claim 7, wherein the longitudinal arm means is pivotally connected with its rear end at the rear lower cross guide means.

10. A rear wheel suspension according to claim 9, wherein the connecting bearing means provided at the forward cross guide means for the approximately vertical support of the longitudinal arm means is disposed nearer to the center of the forward cross guide means than the point of pivotal connection of the rear end of the longitudinal arm means to the center of the rear cross guide means.

11. A rear wheel suspension according to claim 1, wherein the connecting bearing means includes rubber pressure plates of relatively large area which are arranged perpendicularly to its hard-load direction.

12. A rear wheel suspension according to claim 11, wherein stiff intermediate plates are embedded in the rubber pressure plates.

13. A rear wheel suspension according to claim 1, wherein the two lower cross guide means are pivotally connected at an auxiliary frame elastically connected at the vehicle body.

14. A rear wheel suspension according to claim 8, wherein the longitudinal arm means and the rear cross guide means are pivotally connected at the wheel carrier means.

15. A rear wheel suspension according to claim 14, wherein said longitudinal arm means includes a bearing eye which receives a rubber joint bushing operatively connected with the wheel carrier means, said bearing eye externally receiving a further rubber joint bushing which is surrounded by a bearing eye of the lower cross guide means.

16. A rear wheel suspension according to claim 8, wherein the rear end of the longitudinal arm means is connected by way of a rubber joint means with the wheel carrier means and the rear cross guide means is connected with the end of the longitudinal arm means by way of two further rubber bearings arranged at a distance from one another--as viewed in rear elevation.

17. A rear wheel suspension according to claim 7, wherein the longitudinal arm means and the rear cross guide means are constructed as a one-piece structural part.

18. A rear wheel suspension according to claim 17, wherein the cross guide means connected with the longitudinal arm means is relatively soft in bending about an upright axis.

19. A rear wheel suspension according to claim 18, wherein the cross guide means is formed essentially by an on-edge upright metal leaf and wherein the rear end of the longitudinal arm means is threadably secured in the rear area of said metal leaf on the side of the wheel carrier means.

20. A rear wheel suspension according to claim 1, with an upper cross guide means as upper wheel guide means, wherein the cross guide means are rectilinear guide means having a U-profile cross section.

21. A rear wheel suspension according to claim 1, wherein the longitudinal arm means and the two lower cross guide means are constructed as common, one-piece structural part.

22. A rear wheel suspension according to claim 21, wherein the common structural part is made of fiber compound material.

23. A rear wheel suspension according to claim 21, wherein at least one of the cross guide means is constructed relatively stiff in bending about an upright axis.

24. A rear wheel suspension according to claim 23, wherein the common structural part is made of fiber compound material.

25. A rear wheel suspension according to claim 1, wherein the upper wheel guide means is constituted by a cross guide member.

26. A rear wheel suspension according to claim 1, wherein the upper wheel guide means is constituted by a spring leg.

* * * * *